(12) United States Patent
Le Docte et al.

(10) Patent No.: US 7,866,141 B2
(45) Date of Patent: Jan. 11, 2011

(54) COOLING DEVICE FOR THE PRIMARY NOZZLE OF A DUAL-FLOW TURBOJET ENGINE

(75) Inventors: Thierry Jacques Albert Le Docte, Gainneville (FR); Laurent Marcel Vicogne, Le Havre (FR)

(73) Assignee: Aircelle, Gonfreville l'Orcer (FR)

( * ) Notice: Subject to any disclaimer, the term of this patent is extended or adjusted under 35 U.S.C. 154(b) by 953 days.

(21) Appl. No.: 11/630,032

(22) PCT Filed: May 17, 2005

(86) PCT No.: PCT/FR2005/001221

§ 371 (c)(1),
(2), (4) Date: Dec. 19, 2006

(87) PCT Pub. No.: WO2006/016017

PCT Pub. Date: Feb. 16, 2006

(65) Prior Publication Data

US 2008/0044280 A1   Feb. 21, 2008

(30) Foreign Application Priority Data

Jul. 15, 2004   (FR) .................................. 04 07881

(51) Int. Cl.
F02K 1/00   (2006.01)
F02K 3/00   (2006.01)

(52) U.S. Cl. .......... 60/226.1; 60/266; 60/770; 239/265.17; 239/127.3; 181/220

(58) Field of Classification Search ............... 60/226.1, 60/262, 264, 265; 181/213, 220, 184; 239/127.3, 239/265.17
See application file for complete search history.

(56) References Cited

U.S. PATENT DOCUMENTS

| | | | | |
|---|---|---|---|---|
| 2,826,895 A | * | 3/1958 | English | 60/266 |
| 3,215,172 A | * | 11/1965 | Ardoin | 181/220 |
| 3,721,389 A | * | 3/1973 | MacKinnon et al. | 60/226.1 |
| 4,137,992 A | * | 2/1979 | Herman | 181/213 |
| 5,167,118 A | * | 12/1992 | Torkelson | 181/213 |
| 5,269,139 A | * | 12/1993 | Klees | 60/262 |
| 6,122,892 A | | 9/2000 | Gonidec et al. | |

FOREIGN PATENT DOCUMENTS

FR   2 834 533   7/2003

* cited by examiner

*Primary Examiner*—Ted Kim
(74) *Attorney, Agent, or Firm*—Oliff & Berridge, PLC

(57) ABSTRACT

The invention relates to a dual-flow turbojet engine comprising an engine which is disposed in a nacelle and is provided with case which defines jointly with the said nacelle an annular passage through which a secondary flow supplied by a fan placed upstream of the engine can flow, a primary nozzle which is fixed to the case downstream of the engine, an internal wall for guiding the main hot flow supplied by the engine and an external wall contacting the secondary flow. Said invention is characterized in that sound attenuating means is provided for at least one part of the internal wall and the external wall is provided with means for cooling said internal wall.

12 Claims, 4 Drawing Sheets

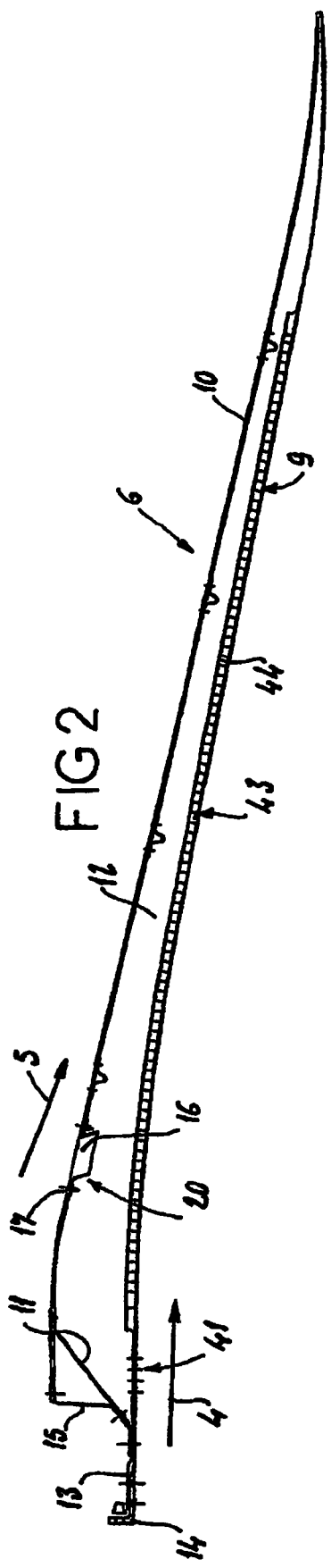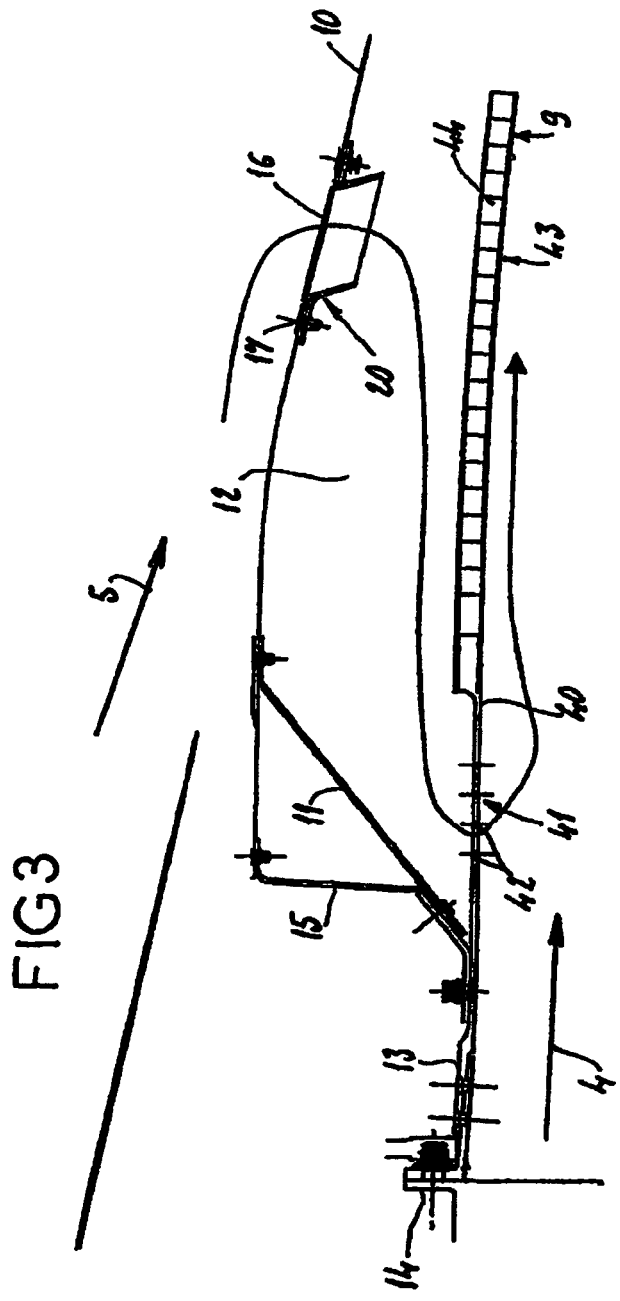

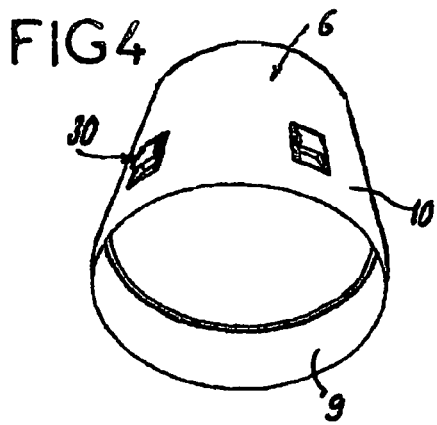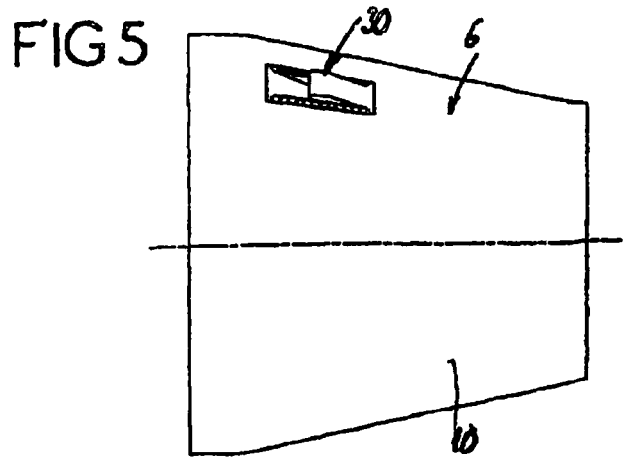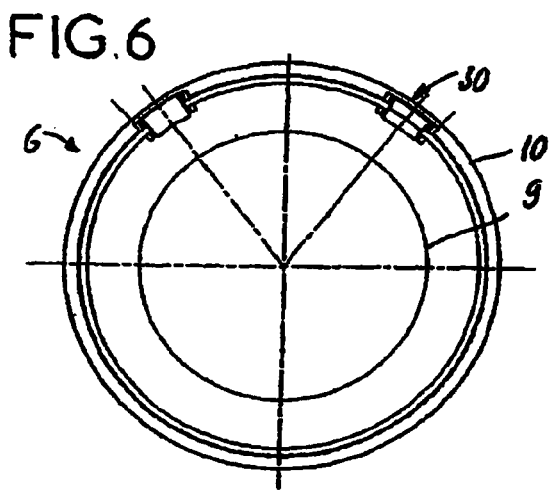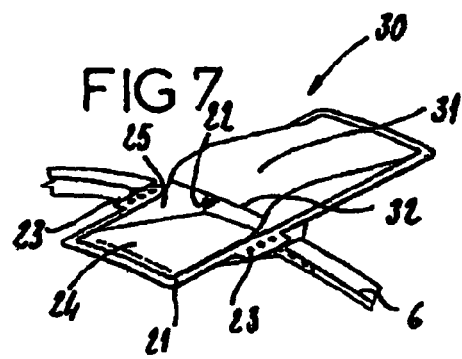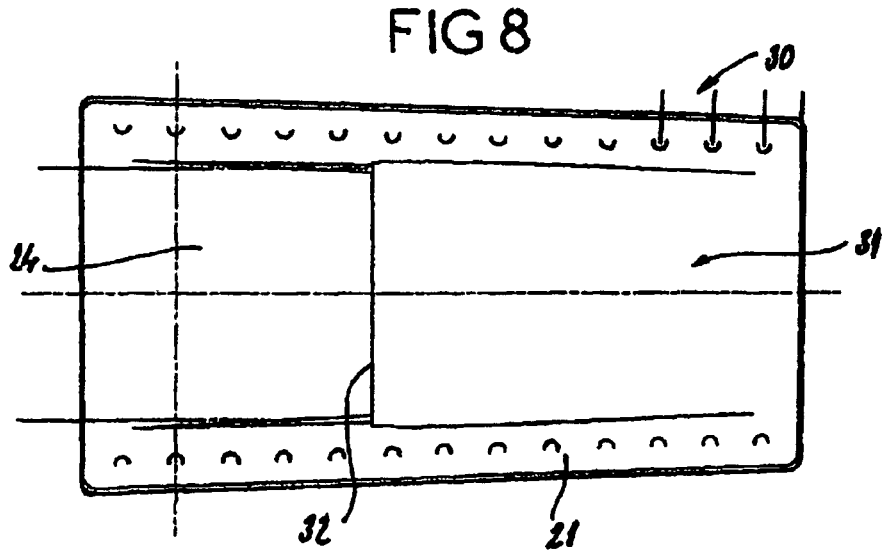

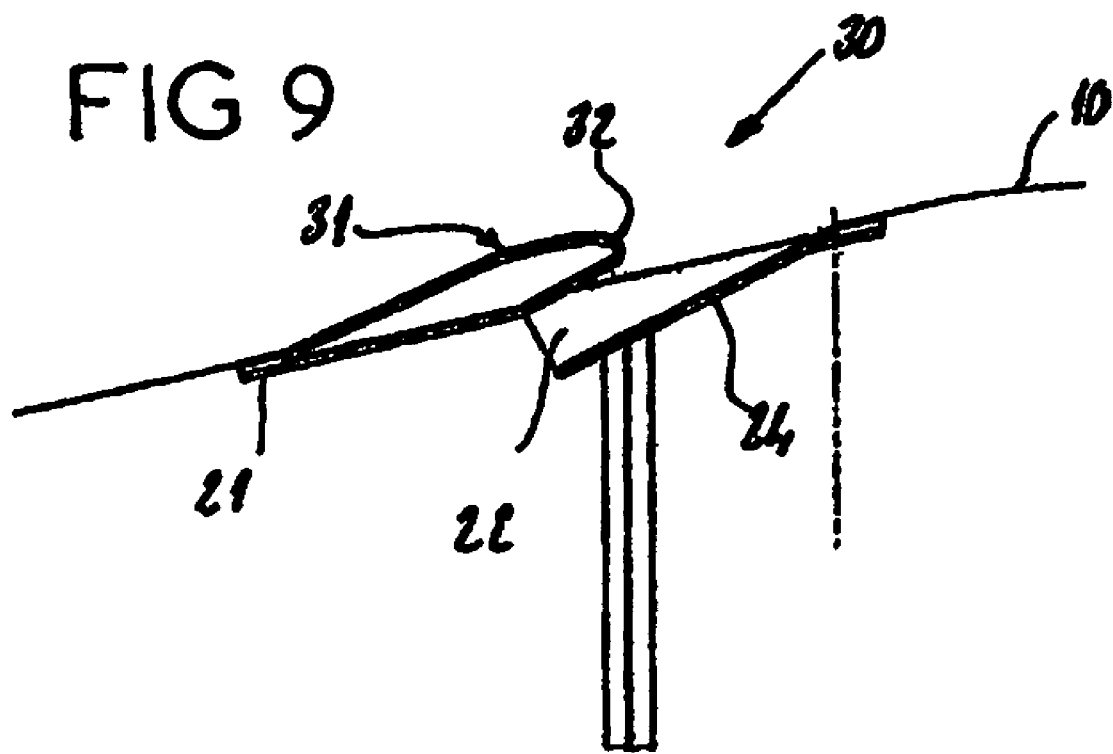

COOLING DEVICE FOR THE PRIMARY NOZZLE OF A DUAL-FLOW TURBOJET ENGINE

The present invention relates, on the one hand, to a dual-flow turbojet engine used in the aeronautical field and, on the other hand, to a primary nozzle equipping such a turbojet engine.

The production of a dual-flow turbojet engine comprising an engine housed completely in a tubular nacelle whose internal wall defines with the casing of the engine an annular passage in which a secondary flow supplied by a fan flows is already known from the document FR 2 834 533. This nacelle has an air inlet upstream of the engine, thrust reversal means in its median section, and a common nozzle for the ejection of the primary flow and of the secondary flow whose outlet is situated downstream of the engine. Means of cooling the common nozzle are provided, in particular when the thrust reversal means are in the position during which the secondary flow is deflected towards the exterior and towards the front of the nacelle, this flow no longer sweeping the external wall of said common nozzle. Such an arrangement finally makes it possible to choose a less dense material for producing the common nozzle.

However, although a solution has been proposed in order to reduce the overall weight of the common nozzle used in a turbojet engine of this type, the fact still remains that, in order to conform with international standards established by aircraft manufacturers, those skilled in the art are always seeking a turbojet engine equipped with a primary nozzle, positioned downstream of the engine, whose sound attenuation is enhanced and whose overall weight is limited as much as possible. In fact, the primary nozzles normally used are constituted using an external wall and an internal wall respectively made of titanium and of inconel, an austenitic Fe—Cr—Ni alloy, because of the good resistance to temperature and of the good intrinsic mechanical characteristics of these materials. However, the overall weight of such a primary nozzle is high, the result of this being that the incorporation of additional sound attenuation means is difficult to envisage.

The purpose of the present invention is to solve the above-mentioned problem, and in order to do so it consists in a dual-flow turbojet engine comprising an engine housed in a nacelle, said engine comprising a casing defining with the nacelle an annular passage in which a secondary flow supplied by a fan situated upstream of the engine can flow, a primary nozzle being fixed on the casing downstream of the engine and comprising, on the one hand, an internal wall able to channel a principal hot flow supplied by the engine and, on the other hand, an external wall in contact with the secondary flow, characterized in that sound attenuation means equip at least a part of the internal wall, and in that the external wall comprises means for cooling the internal wall.

In this way, in a turbojet engine according to the invention, the presence of means for cooling the internal wall allows the use of materials of lower density but less resistant to heat in order to produce the primary nozzle. Finally, this makes it possible to compensate for the additional weight resulting from the integration of sound attenuation means in the internal wall.

According to a preferred embodiment, the means for cooling the internal wall comprise at least one means of taking in cooling air. Preferably, these means of taking in cooling air are produced by means of a scoop fitted in the external wall and designed to take in an air flow coming from the secondary flow.

Advantageously, the internal wall comprises a plate provided with a means of distributing cooling air along the internal wall. The air collected by the means of taking in cooling air is then taken to the distribution means, advantageously produced in the form of a drilling pattern in the plate, in order then to brush the surface of the internal wall, which finally makes it possible to protect the latter from the hot air supplied by the engine.

Preferably, the sound attenuation means equipping the internal wall are produced in the form of a sandwich panel placed downstream of the cooling air distribution means.

According to a variant of the invention, the means for cooling the internal wall can comprise at least one ducting means, disposed between a means of taking in cooling air and a means of distributing cooling air.

The present invention also relates to a primary nozzle intended to be positioned downstream of an engine equipping an aircraft, characterized in that it comprises an external wall provided with means for cooling an internal wall provided with sound attenuation means.

According to the invention, the means for cooling the internal wall advantageously comprise at least one means of taking in cooling air. Furthermore, the latter is preferably produced by means of a scoop fitted in the external wall and designed to take in an air flow coming from the secondary flow.

Preferably, the internal wall comprises a plate provided with a cooling air distribution means situated upstream of the sound attenuation means.

Moreover, the sound attenuation means equipping the internal wall are advantageously produced in the form of a sandwich panel placed downstream of the cooling air distribution means.

According to a variant embodiment of the invention, the means for cooling the internal wall comprise at least one ducting means placed between a means of taking in cooling air and a cooling air distribution means.

The invention will be better understood with the help of the detailed description given below with reference to the appended drawing in which:

FIG. 2 is a partial diagrammatic view in cross-section of a primary nozzle according to a first embodiment of the invention.

FIG. 3 is an enlarged partial view of the nozzle shown in FIG. 2.

FIG. 4 is a frontal perspective view of a primary nozzle according to a second embodiment of the invention.

FIG. 5 is a side view of the nozzle shown in FIG. 4.

FIG. 6 is a view in transverse cross-section of the nozzle shown in FIG. 4.

FIG. 7 is a perspective view of a scoop equipping the nozzle shown in FIG. 4.

FIG. 8 is a plan view of the scoop shown in FIG. 7.

FIG. 9 is a view in cross-section of the scoop shown in FIG. 7.

Figure 1:
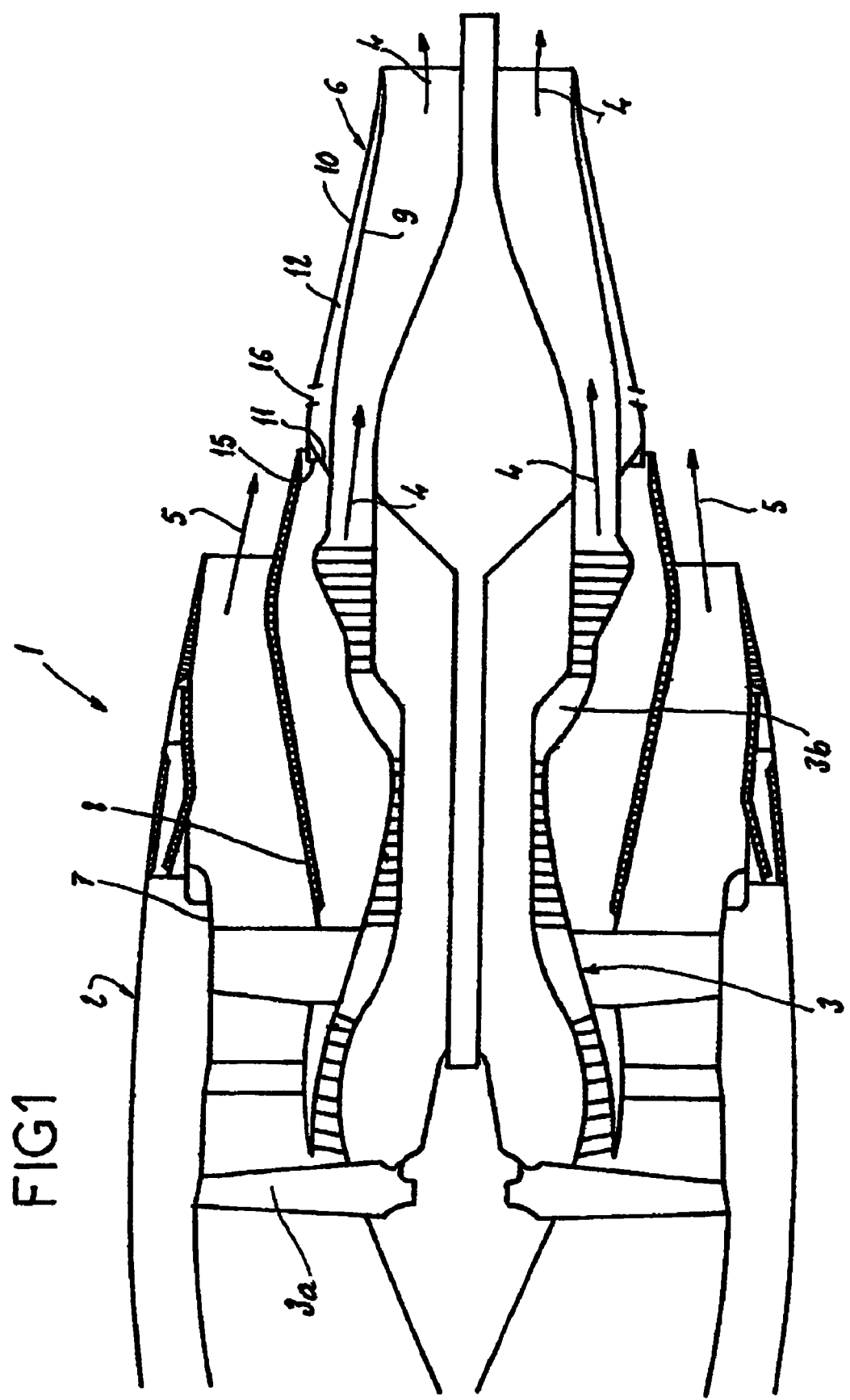
FIG. 1 is a diagrammatic view in cross-section of a turbojet engine unit equipped with a primary nozzle.

A turbojet engine 1, such as shown in FIG. 1, in general comprises a nacelle 2 surrounding a dual-flow engine 3 comprising a combustion chamber 3b.

By the intermediary of blades of a rotating fan 3a, this engine 3 generates two airflows at the outlet of the nacelle 2, namely a hot air flow 4 coming from the combustion chamber 3b, and a cool air flow 5, called the secondary flow, which circulates outside of the engine between an internal wall 7 of the nacelle 2 and an external wall of a cowling 8 surrounding the engine 3. The hot air flow 4 therefore has a high temperature, situated in the region of 750° C., whereas the cool air flow 5 has a distinctly lower temperature, situated in the region of 100° C.

These two flows 4, 5 are ejected from the turbojet engine 1 through the rear of the nacelle 2. More precisely, the hot air flow 4 is elected through an ejection nozzle, called the primary nozzle 6, fixed at the outlet of the combustion chamber 3b.

As shown in FIGS. 2 and 3, the primary nozzle 6 comprises an internal wall 9 swept by the hot air flow 4, and an external wall 10, along which flows the cool air flow 5. The internal wall 9 and the external wall 10 join at the rear of the primary nozzle 6 and are connected at the front by a stiffener 11. The walls 9, 10, 11, thus define an internal space 12.

The fixing of the primary nozzle 6 to the rear of the engine 3 is carried out by means of a fixing flange 13 extending the internal wall 9 and screwed to a fixing flange 14 of the engine 3. Furthermore, the external wall 10 is slightly extended in the upstream direction beyond the stiffener 11 and is terminated by an angle 15 not connected to the stiffener 11 and formed from flexible sheets intended to provide the junction with the downstream end of the cowling 8.

The external wall 10 is made in the form of a beta21s sheet in which are produced openings 16 each intended to receive a scoop fixed by nuts 17. The openings 16 are produced in such a way as to be situated at about 45° on either side of the anchoring point of the nacelle 2 and of the engine 3.

Beta21s is a titanium alloy commercially available under the name TIMETAL21S from the TIMET company. This material is particularly suitable for aeronautical construction because of its good mechanical properties and its low density, equal to about half the density of inconel. The use of this material therefore allows a very significant weight saving. However, as the fixing flanges 13, 14 and the stiffener 11 are directly exposed to the hot air flow 4 at the outlet of the combustion chamber 3b, they are still made from inconel. Moreover, it must be understood that inconel and beta21s are materials given solely by way of example as they are currently used in this field, the device according to the invention absolutely not being limited to the use of these materials.

According to a first embodiment, such as shown in FIGS. 2 and 3, the scoops are static scoops 20 so-called because they do not protrude beyond the aerodynamic lines of flow of the cool air flow 5 along the external wall 10 of the primary nozzle 6. Such a static scoop 20 comprises, on the one hand, a frame 21 defining an opening 22 and having two lateral lugs 23 intended to be traversed by the nuts 17 for fixing the static scoop 20 to the upper wall 10 and, on the other hand, a wall 24 that is inclined with respect to the plane of the frame 21 and intended to orient the flow of cool air 5 entering the static scoop 20. This inclined wall 24 is connected to the front of the frame 21, in the direction of the cool air flow 5, and is bordered by two lateral walls 25'. The length and the inclination of this inclined wall 24 are of course adapted to take in and orient an adequate quantity of cool air 5.

According to a second embodiment, such as shown in FIGS. 4 to 9, the scoops are dynamic scoops 30. A dynamic scoop 30 differs from a static scoop 20 solely by the fact that it has a peak 31 covering a downstream part of the frame 21 and protruding beyond the aerodynamic lines. This peak 31 has an edge 32 profiled in such a way as to be an obstacle to the cool air flow 5 and to orient it towards the opening 22. The choice between a static scoop 20 and a dynamic scoop 30 will be made according to the quantity of the cool air 5 that they make it possible to take in and to the pressurization requirement of the internal space 12 of the primary nozzle 6.

The internal wall 9 is also made from a beta21s sheet 40, lighter than inconel but less resistant to high temperatures. As explained previously, the internal wall 9 is intended to be in contact with the hot air flow 4. It is not therefore desirable to expose it directly to contact with the hot air flow without providing a cooling system.

In order to improve the heat resistance of the internal wall 9, the sheet 40 has, on the one hand, an aeration zone 41 in which openings 42 are produced in an appropriate drilling pattern. These openings form a means of distributing cooling air. Moreover, the sheet 40 also has an sound attenuation zone 43, situated downstream of the aeration zone 41, with respect to the direction of the hot air flow 4, comprising an acoustic sandwich panel 44 oriented towards the hot air flow 4, the weight saving produced by using beta21s allows the fitting of this sandwich panel 44 which, if it had been made of inconel, would have made the structure too heavy.

During operation, the hot air flow 4, from the output of the combustion chamber 3b, flows inside the primary nozzle 6 along the lower wall 9 whilst the cool air flow 5, after its passage between the internal wall 7 of the nacelle 2 and the external wall of the cowling 8, flows on the outside of the primary nozzle 6 along the upper wall 10.

Whilst flowing along the upper wall 10, the cool air 5 meets the static 20 or dynamic 30 scoops, depending on the embodiment, and penetrates into the internal space 12 whose pressure it increases.

At the lower wall 9, the hot air flow 4 creates a pressure reduction at the level of the openings 42 of the aeration zone 41 causing the escape of the cool air present in the internal space 12 at a higher pressure. This is then driven along the lower wall 9 and forms a cool fluid layer between the latter and the hot air flow 4.

It is appropriate to note here that the drilling pattern formed by the openings 42 is designed in such a way that the cool air present in the internal space 12 escapes and flows very close to the lower wall 9. Moreover, in the described embodiment, it is the internal space 12 which has the ducting function between the static 20 or dynamic 30 scoops and the openings 42. However, it is entirely possible to provide a specific ducting means such as a pipe making this connection. In this case, as the volume of the ducting means is lower, the pressurization will be easier and a static scoop 20 could suffice here where a dynamic scoop 30 had been necessary.

Furthermore, the described embodiments describe the production of a drilling pattern. It must be understood that it is also possible to provide other forms of openings, such as slots, or multiple openings each associated with its own ducting means. The expression "drilling pattern" must therefore be defined globally with respect to the distribution of the totality of the cool air brought to the level of the lower wall 9 and not individually with respect to a given ducting means.

Even though the invention has been described with reference to particular examples of embodiment, it is of course obvious that it is in no way limited by them and that it includes all techniques equivalent to the described means and their combinations if the latter fall within the scope of the invention.

The invention claimed is:

1. A dual-flow turbojet engine comprising an engine housed in a nacelle, said engine comprising a casing defining with the nacelle an annular passage in which a secondary flow supplied by a fan situated upstream of the engine can flow, a primary nozzle being fixed on the casing downstream of the engine and comprising, on the one hand, an internal wall able to channel a principal hot flow supplied by the engine and, on the other hand, an external wall in contact with the secondary flow, wherein sound attenuation means equip at least a part of the internal wall, and in that the external wall comprises means for cooling the internal wall, and the means for cooling the internal wall including means of taking in cooling air from the secondary flow, at least one ducting means that allows the cooling air to flow over the sound attenuation means, disposed between the means of taking in cooling air and a means of distributing cooling air to a location spaced from the sound attenuation means.

2. The turbojet engine as claimed in claim 1, wherein the means of taking in cooling air is produced by means of a scoop fitted in the external wall and designed to take in an air flow coming from the secondary flow.

3. The turbojet engine as claimed in claim 2, wherein the internal wall comprises a plate provided with a means of distributing cooling air along the internal wall.

4. The turbojet engine as claimed in claim 1, wherein the internal wall comprises a plate provided with a means of distributing cooling air along the internal wall.

5. The turbojet engine as claimed in claim 4, wherein the sound attenuation means equipping the internal wall are produced in the form of a sandwich panel placed downstream of the cooling air distribution means.

6. The turbojet engine as claimed in claim 1, wherein the internal wall comprises a plate provided with a means of distributing cooling air along the internal wall.

7. A primary nozzle positioned downstream of an engine equipping an aircraft, comprising:

an external wall, in contact with a cool secondary flow external to the nozzle, provided with means for cooling an internal wall provided with sound attenuation means, the internal wall in contact with a hot flow within the nozzle, the means for cooling the internal wall including means of taking in cooling air from the secondary flow, at least one ducting means that allows the cooling air to flow over the sound attenuation means, disposed between the means of taking in cooling air and a means of distributing cooling air to a location spaced from the sound attenuation means.

8. The primary nozzle as claimed in claim 7, wherein the means of taking in cooling air is produced by means of a scoop fitted in the external wall and designed to take in an air flow coming from the secondary flow.

9. The primary nozzle as claimed in claim 8, wherein the internal wall comprises a plate provided with a means) of distributing cooling air along the internal wall.

10. The primary nozzle as claimed in claim 7, wherein the internal wall comprises a plate provided with a means of distributing cooling air along the internal wall.

11. The primary nozzle as claimed in claim 10, wherein the sound attenuation means equipping the internal wall are produced in the form of a sandwich panel placed downstream of the cooling air distribution means.

12. The primary nozzle as claimed in claim 7, wherein the internal wall comprises a plate provided with a means of distributing cooling air along the internal wall.

* * * * *